May 12, 1925.
G. E. BISHOP
1,537,522
MOUNTING FOR AUTOMOBILE SIDE INCLOSURES
Original Filed Oct. 2, 1919
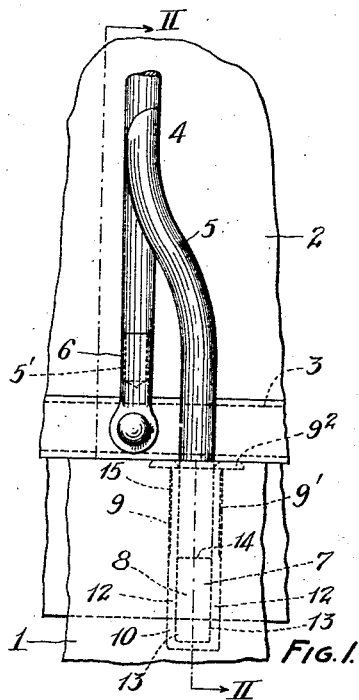
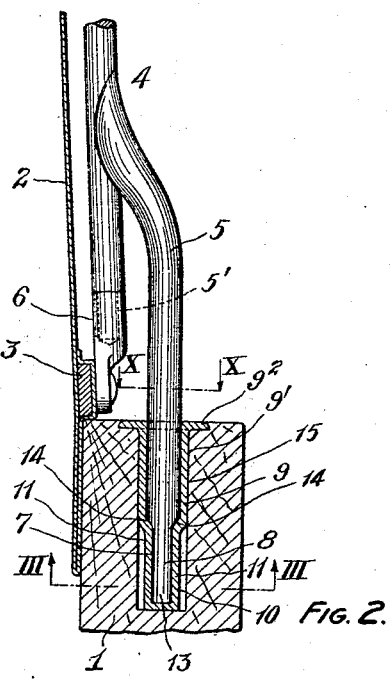
INVENTOR
GEORGE E. BISHOP
BY
ATTORNEY Patented May 12, 1925.

1,537,522

UNITED STATES PATENT OFFICE.

GEORGE E. BISHOP, OF CLEVELAND, OHIO.

MOUNTING FOR AUTOMOBILE SIDE INCLOSURES.

Original application filed October 2, 1919, Serial No. 327,952. Divided and this application filed April 18, 1922. Serial No. 554,462.

*To all whom it may concern:*

Be it known that I, GEORGE E. BISHOP, a citizen of the United States, resident of Cleveland, county of Cuyahoga, and State of Ohio, have invented new and useful Improvements in Mountings for Automobile Side Inclosures (Case R), of which the following is a specification, the principle of the invention being herein explained and the best mode in which I have contemplated applying that principle so as to distinguish it from other inventions.

The subject matter of this application has been divided out of my pending application, Serial No. 327,952 filed Oct. 2, 1919.

My invention relates to side inclosures for automobiles and particularly to a support and mounting for said inclosures. The invention also relates to a new and improved bushing member forming part of such a support and mounting. The purposes of the invention are to provide supporting means which are very strong in the plane in which the heaviest stresses are imposed, i. e., where the supporting rod enters the cooperating bushing member; which will not be unduly tight or become wedged in the mounting, but which shall at the same time provide a dependable support; in which the supporting rod is kept from turning in the cooperating bushing member and the latter is kept from turning in the door socket; and in which an accuracy of mounting is obtained which is greater than that which can be secured by rolling the mounting surfaces or otherwise producing them by pressure.

The annexed drawing and the following description set forth in detail certain means embodying my invention, the disclosed means, however, constituting but one of the various mechanical forms in which the principle of the invention may be employed.

In said annexed drawing:

Figure 1 represents a side elevation of my improved support and mounting, in combination with a fragmentary elevation of an automobile body and automobile side inclosure;

Figure 2 represents a transverse vertical section, taken in the planes indicated by the lines II—II, Figure 1;

Figure 3 represents a fragmentary horizontal section, taken in the plane indicated by the line III—III, Figure 2;

Figures 4, 5 and 6 represent elevations from relatively right angular planes, and a plan view, respectively, of a bushing element forming part of my invention;

Figure 7 represents a horizontal section, taken in the plane indicated by the line VII—VII, Figure 5;

Figure 8 represents a section through an automobile door in the axial plane of a socket formed therein for receiving a bushing element differing from that shown in Figures 4, 5 and 6, said section being in the plane indicated by the line VIII—VIII, Figure 9;

Figure 9 represents a horizontal section taken in the plane indicated by the line IX—IX, Figure 8; and Figure 10 represents a horizontal section taken in the plane indicated by the line X—X, Figure 2.

Referring to the annexed drawing, in which the same respective ordinals in the several views refer to the same elements, an automobile body is indicated by the ordinal 1, preferably one of the doors of the automobile, upon which is mounted an inclosure 2 adapted to be carried in and out with the door as the latter is opened and shut. This inclosure 2 is formed of suitable curtain fabric and is provided with longitudinal strengthening members of which one is suggested by the element 3. This particular type of inclosure is shown, described and claimed in my pending application, Serial No. 327,952, from which the subject matter of this present application has been divided out. The automobile inclosure 2 has a pivotal or swivel action relative to its supporting and mounting means, which is afforded by sub-dividing the supporting rod 4 into three sections, a main supporting section 5, a lower tip section 6 and an upper tip section at the top (not shown), the sections 6 and the one at the top being pivotally secured to the upper and lower strengthening members of which lower member 3 is shown. These tip sections have open-ended recesses to receive reduced cylindrical end portions 5' of the main rod portion 5, as plainly shown in Figure 2. This construction which also allows for the turning down of the supporting rod for storage is plainly shown and described in my said pending application, Serial No. 327,952.

The supporting rod 5 is cylindrical in cross-section except for the lower end which is formed with a flat surface 7 or preferably, as shown, the rod 5 is flattened upon both sides to form a double face flat portion 8. In order to secure an accuracy of mounting which cannot be secured by rolling the flat surfaces 7 or otherwise producing them by pressure, I prefer to produce these surfaces by milling the cylindrical blank. The lower end of the rod 5 is received by a bushing 9 having a spun flange 9², an upper cylindrical portion 9′ which receives the cylindrical rod with a non-binding fit, and a drawn lower angular portion 10 having plane surfaces, illustrated by the side walls 11, adapted closely to register with the plane surfaces 7 of the lower portion 8 of the supporting rod. The bushing 9 is made from any suitable material, preferably cylindrical tubing, and the end walls 12 of the lower portion 10 thereof, in the form of bushing illustrated in Figures 3 and 5 are formed closely to register with the curved end walls 13 of the lower rod portion 8, as plainly shown in Figure 3, the diameter of the bushing in the plane of these end walls 12 being greater than that of the original tubing, and, of course, in the plane of the side walls 11, being less than that of the original tubing. The mandrel upon which the bushing 9 is formed is shaped so as also to form inner bushing shoulders 14 disposed intermediate the cylindrical portion 9′ of the bushing and the angular lower portion 10 and upon which shoulders the cylindrical portion 5 of the supporting rod rests, so that the rod will not be unduly tight or become wedged in its mounting. Of course, the bushing may be formed in other ways, such as properly turning up a flat blank, etc. and in this event it may be desirable and even save an operation to have a bottom closed bushing end, instead of an open-ended bushing which would preferably be formed from tubing and to illustrate such bushings with a closed bottom end I have thus shown them in the accompanying drawing. This bushing 9 is secured to the automobile body, preferably by driving the same into a socket 15 formed in the door 1, the end walls 12 of the bushing cutting through the door material, if the bushing is formed with the enlarged diameter in the plane of the walls 12, as shown in Figure 3. However, if this enlargement or bulge were on the plane walls 11 of the bushing and if the diameter of this bulge were no greater than the top part of the socket 15, then in order to have door material through which the bushing could cut, it would be necessary to make the lower portion 17 of the socket smaller, as shown by the clearance area 18, Figure 9. In this event the surfaces of the bushing walls 11 which would register with the rod faces 7 to prevent the turning of the rod would be two upon each wall 11 separated by the base of the enlargement formed upon the wall. The thickened walls 12 thus form means for securely retaining the bushing 9 in the door 1, to keep the same from turning in the door socket. The extension of the bushing end walls 12, Figure 3, may be carried to a degree where means more pronounced than these thickened walls are formed for securely retaining the bushing 9 in the automobile body. This may be effected by using oversize tubing to form the bushing, in which tubing the cylindrical rod portion 5 need have only an approximate fit, the extra material of this over-size tubing being utilized further to extend the walls 12 to form lateral wings or definite keys for preventing the bushing from turning in the door socket 15.

What I claim is:—

1. A support and mounting for automobile side inclosures comprising, a cylindrical supporting rod having a plane lower end; and a bushing adapted to be secured to an automobile body, said bushing having an upper cylindrical portion receiving the cylindrical rod with a non-bending fit and a lower portion having a plane surface formed closely to register with the plane surface of the supporting rod, interiorly disposed shoulders being formed in the bushing intermediate said upper and lower portions thereof and upon which the cylindrical rod rests.

2. A support and mounting for automobile side inclosures comprising, a cylindrical supporting rod having oppositely disposed plane lower side faces; and a bushing adapted to be secured to an automobile body, said bushing having an upper cylindrical portion receiving the cylindrical rod and a lower portion having a pair of oppositely disposed outwardly extended walls, and alternate plane surfaces formed closely to register with the plane surfaces of the supporting rod, interiorly disposed shoulders being formed in the bushing intermediate said upper and lower portions thereof and upon which the cylindrical rod rests.

3. A support and mounting for automobile side inclosures comprising, in combination with an automobile door formed with a socket; a cylindrical supporting rod having a plane lower end; and a bushing secured in said socket, said bushing having an upper cylindrical portion receiving the cylindrical rod and a lower portion having surfaces formed closely to register with the plane surface of the supporting rod, and a pair of outwardly extended walls, the over-all dimension of the bushing in the plane of said outwardly extended walls being greater than the diameter of the lower portion of the door socket.

4. A support and mounting for automobile side inclosures comprising, in combination with an automobile door formed with a socket; a cylindrical supporting rod having oppositely disposed plane lower side faces; and a bushing secured in said socket, said bushing having an upper cylindrical portion receiving the cylindrical rod and a lower portion having a pair of oppositely disposed plane walls formed closely to register with the plane surfaces of the supporting rod, and a pair of outwardly extended walls, disposed alternately to said plane walls, and engaging the socket wall to prevent the turning of the bushing.

5. A support and mounting for automobile side inclosures comprising, in combination with an automobile door formed with a socket; a cylindrical supporting rod having oppositely disposed plane lower side faces; and a bushing secured in said socket, said bushing having an upper cylindrical portion receiving the cylindrical rod and a lower portion having a pair of oppositely disposed plane walls formed closely to register with the plane surfaces of the supporting rod, and means, disposed alternately to said plane walls, to prevent the bushing from turning in the door socket.

6. A support and mounting for automobile side inclosures comprising a one-piece bushing member and a cylindrical rod member, said bushing member having a longitudinal hole circular in cross-section for a portion of its length and whose wall cooperates with the cylindrical rod member with a non-binding fit, said hole and rod being formed for a portion of their lengths so as to provide engaging rod and hole-wall surfaces adapted to prevent rotation of the rod in the bushing member, shoulders being formed at the upper end of said last-mentioned engaging surfaces, whereby the entry of the rod into the bushing member is limited and the same is held in the circular portion of the bushing member with a non-wedging fit.

7. A bushing member for automobile side inclosure rods comprising a one-piece metal body having a longitudinal hole circular in cross section for a portion of its length and whose wall is adapted to cooperate with a cylindrical inclosure rod with a non-binding fit, another portion of said hole being non-circular in cross section and having a wall portion adapted to engage a cooperating section of the inclosure rod to prevent the rotation of the latter in the bushing member, a shoulder being formed at the upper end of said non-circular section upon which the rod can rest.

8. A bushing member for automobile side inclosure rods comprising a metal body having a longitudinal hole circular in cross section for a portion of its length and whose wall is adapted to cooperate with a cylindrical inclosure rod with a non-binding fit, another portion of said hole being non-circular in cross section and having a wall portion adapted to engage a cooperating section of the inclosure rod to prevent the rotation of the latter in the bushing member, said non-circular portion of said hole having another and laterally-extended wall adapted to engage the wall of an automobile door socket to prevent the turning of the bushing member in the door socket.

Signed by me this 8th day of April, 1922.

GEORGE E. BISHOP